(12) United States Patent
Horng et al.

(10) Patent No.: US 6,839,379 B1
(45) Date of Patent: Jan. 4, 2005

(54) ADAPTIVE DS-CDMA MULTI-USER RECEIVER WITH DIVERSITY COMBINING FOR INTERFERENCE CANCELLATION

(75) Inventors: Jyhchau Horng, Warren, NJ (US); Jay Bao, Bridgewater, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 931 days.

(21) Appl. No.: 09/643,278

(22) Filed: Aug. 22, 2000

Related U.S. Application Data

(63) Continuation-in-part of application No. 09/487,095, filed on Jan. 19, 2000, now Pat. No. 6,650,653.

(51) Int. Cl.[7] .............................................. H04B 1/707
(52) U.S. Cl. ...................................... 375/148; 375/144
(58) Field of Search .............................. 375/144, 148, 375/267, 347; 370/335, 342

(56) References Cited

U.S. PATENT DOCUMENTS

| | | | | |
|---|---|---|---|---|
| 5,598,428 A | * | 1/1997 | Sato | 375/148 |
| 5,812,542 A | * | 9/1998 | Bruckert et al. | 370/335 |
| 6,069,912 A | * | 5/2000 | Sawahashi et al. | 375/142 |
| 6,178,194 B1 | * | 1/2001 | Vasic | 375/136 |
| 6,385,181 B1 | * | 5/2002 | Tsutsui et al. | 370/335 |
| 6,529,545 B2 | * | 3/2003 | Tiirola et al. | 375/148 |
| 6,580,771 B2 | * | 6/2003 | Kenney | 375/346 |

OTHER PUBLICATIONS

Cho et al.; "Adaptive Interference Cancellation with Diversity Combining for a DS–CDMA System in Rayleigh Fading"; Proc. Of IEEE, VTC'99, May 1999.

* cited by examiner

*Primary Examiner*—Young T. Tse
(74) *Attorney, Agent, or Firm*—Dick Brinkman; Andrew Cartin

(57) ABSTRACT

A digital receiver detects symbols in a baseband signal in a DS-CDMA network. The receiver includes multiple spaced apart antennas. A time-frequency rake receiver is connected to each of the antennas. An interference canceller is connected to each output of each of the rake receiver. Each interference canceller produces a contributing symbol in parallel. A diversity combiner determines a decision symbol corresponding to the baseband signal from the contributing symbols.

13 Claims, 5 Drawing Sheets

ADAPTIVE DS-CDMA MULTI-USER RECEIVER WITH DIVERSITY COMBINING FOR INTERFERENCE CANCELLATION

CROSS-REFERENCE TO RELATED APPLICATION

This is a continuation-in-part of application Ser. No. 09/487,095, filed Jan. 19, 2000, now U.S. Pat. No. 6,650,653 "Software-Based Digital Receiver Adaptable to Multiple Multiplexing Schemes," issued to Horng, et al., on Nov. 18, 2003.

FIELD OF THE INVENTION

The present invention relates generally to wireless digital receivers, and more particularly to a wireless DS-CDMA communication network having multiple concurrent transmitters.

BACKGROUND OF THE INVENTION

The explosive growth of mobile telecommunication networks demands flexible, efficient, high performance receivers, for example, base stations in cellular networks. In a wireless CDMA communication network, multiple access interference (MAI) is one of the major factors that limits the performance of the network. To combat the effect of MAI, many digital receivers have been proposed. However, prior art digital receivers are generally characterized by a fairly high computational complexity.

The major cause of the computational complexity lies on the block-based processing in the receivers, i.e., the receivers detect the signal based on a block of received samples. Multi-user receivers also require a great deal of additional information which typically includes a code sequence, relative timing, carrier phase, and sometimes the instantaneous received signal strength for each mobile transmitter or transceiver, e.g., a cellular telephone.

Channel fading is another cause of performance degradation in wireless communication networks. The increased mobility of receivers in wireless communication networks often results in fast fading and the resulting Doppler spread substantially degrades the receiver performance.

Recently, minimum mean square error (MMSE) receivers have been developed. As an advantage, a MMSE receiver has a lower complexity and the detection decision is made on a per symbol basis. In addition, a MMSE receiver with space diversity features has been described for multi-user detection, see Cho et al., "*Adaptive Interference Cancellation with Diversity Combining for a DS-CDMA System in Rayleigh Fading,*" Proc. of IEEE VTC'99, May 1999. Due to the use of diversity combining technique, network performance and capacity are is improved.

However, in the case of a fast fading channel, little performance improvement can be achieved, even if the diversity dimension is increased. One way to combat fast fading channels in CDMA networks is to use of time-frequency diversity combining techniques, see U.S. patent application Ser. No. 09/487,095 "Software-Based Digital Receiver Adaptable to Multiple Multiplexing Schemes," filed by Horng at al. on Jan. 19, 2000. However, that receiver can only detect a single user. With the increased mobility of receivers, frequency diversity becomes more and more important because high mobility introduce severe frequency drifts on the transmitted signals.

Therefore, it is desired to provide a multi-user receiver that has a greater capacity, a lower bit rate error, and that is less susceptible to channel fading and multiple-access interference.

SUMMARY OF THE INVENTION

The present invention provides an adaptive receiver for detecting multiple user signals in a DS-CDMA network. The receiver includes multiple antennas. A time-frequency rake receiver is connected to each of the antenna. An interference cancellers is connected to an output of each rake receiver, and a diversity combiner, connected to outputs of each interference canceller, determines decision symbols corresponding to input signals received at the antennas. The antennas are spaced about three to five times the wavelength of the baseband signals.

DETAILED DESCRIPTION OF THE PREFERRED EMBODIMENT

Our invention provides an adaptive multi-user receiver for detecting digital symbols in a direct sequence—code division multiple access (DS-CDMA) network. Our receiver exploits space-time-frequency diversities to mitigate the effects of channel fading and multiple-access interference. We utilize multiple antennas, noise interference cancellers (IC), and frequency modulators to generate different diversities. The operation of the adaptive noise IC is based on a minimum mean square error (MMSE) criterion. With a suitable training signal, our receiver has a greater capacity and a lower bit-rate error than a conventional receiver that uses a matched filter.

Receiver Overview

Figure 1:
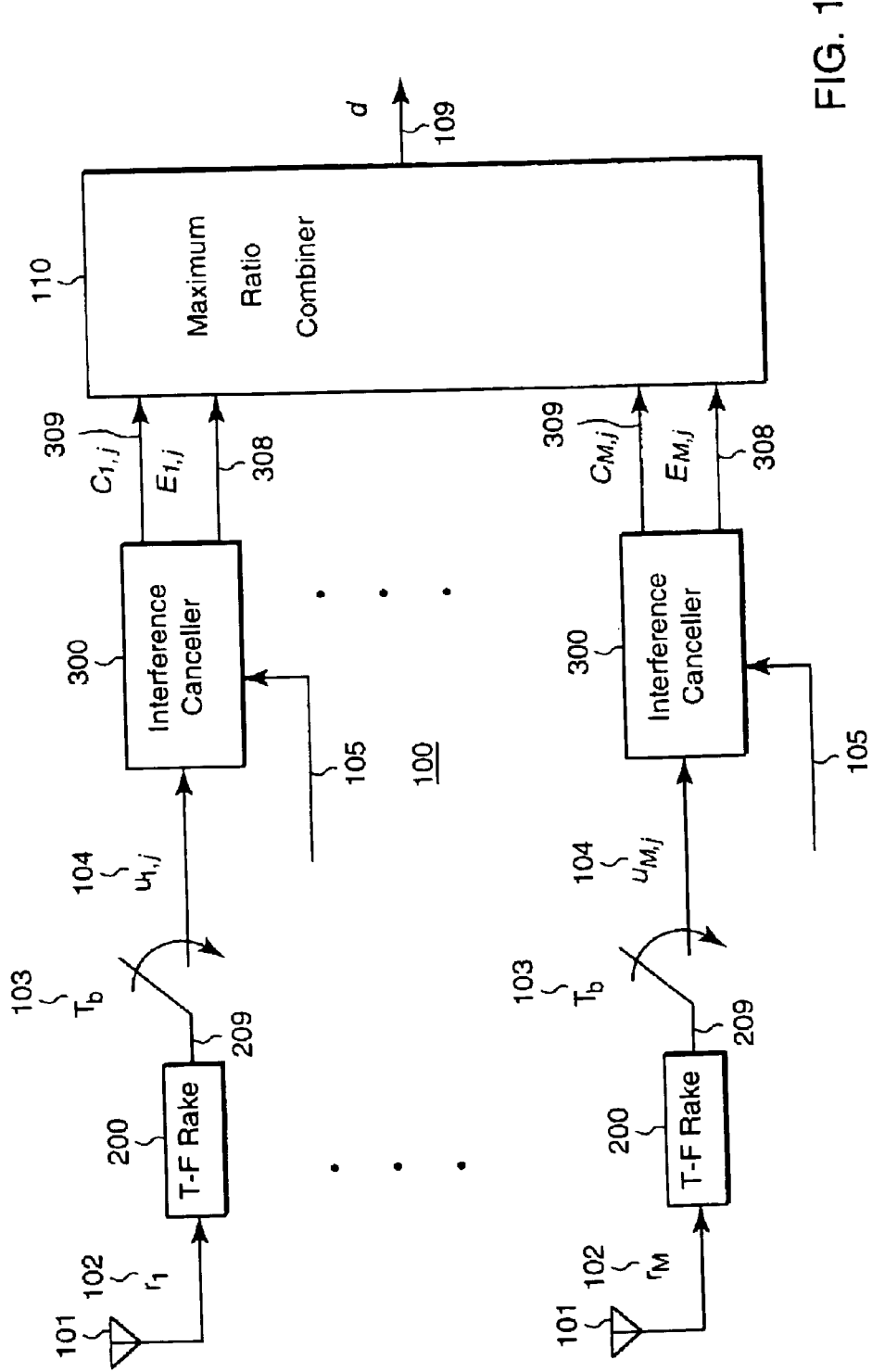
FIG. 1 is a block diagram of an adaptive DS-CDMA multi-user receiver according to the invention.

FIG. 1 shows an adaptive DS-CDMA multi-user receiver 100 according to our invention. The receiver concurrently detects baseband signals from multiple transmitters, e.g., cellular telephones. The receiver 100 includes M antennas 101. Each antenna 101 is widely spaced such that each concurrently received baseband signal $r_i$-$r_M$ 102 can be considered independent from any signal received at another antenna. To meet this requirement, the distance between the antennas 101 is about three to five times the wavelength of the received signal.

Figure 2:
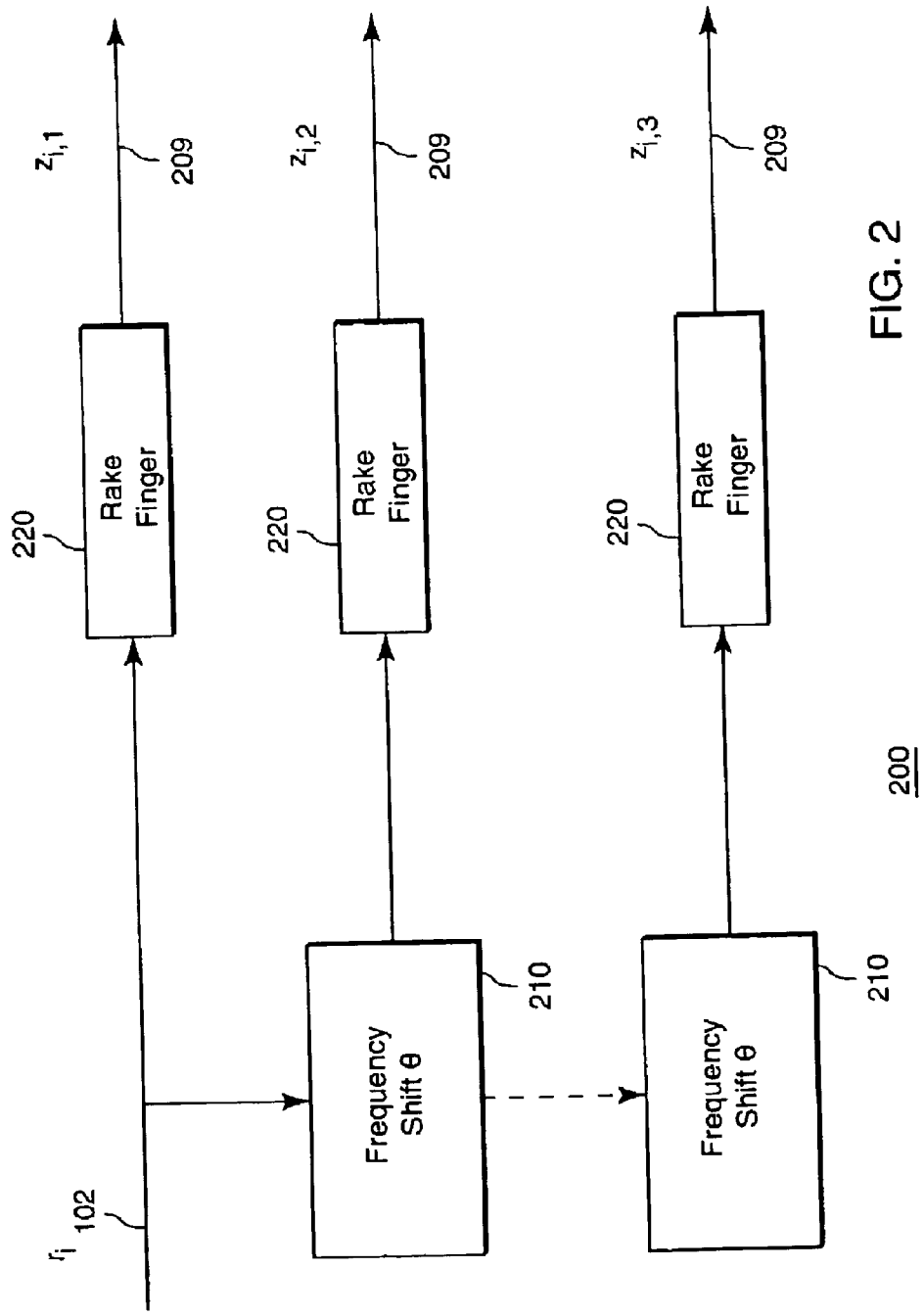
FIG. 2 is a block diagram of a time-frequency receiver of the receiver of FIG. 1.

Each antenna 101 is connected to a time-frequency rake (T-F Rake) receiver 200, see FIG. 2 for details. The outputs 209 of each T-F rake receiver 200, i.e., $z_{i,j}$ for j=1, 2, ..., N, are sampled at symbol times $T_b$103 to form down-sampled signals $u_{i,j}$ 104. Each down-sampled signal $u_{i,j}$ is filtered for interference cancellation and channel equalization by a MMSE adaptive filter based interference canceller (IC) 300, see FIG. 3.

The IC 300 uses a training signal 105 during an initialization stage to establish weightings for coefficients of equalizer taps of the interference canceller. The MMSE based IC 300 outputs two signals, an error signal $E_{i,j}$ 308 and a contributing symbol $C_{i,j}$ 309, for data decision by a combined 110. The combiner makes a symbol decision d 109 by maximizing the ration for the combined contributing symbols 309 from the ICs 300.

Due to the use of the adaptive MMSE interference cancellers 300, our receiver 100 can detect the signal on a bit duration basis, instead on a block basis. Our receiver is less complex than a conventional block-processing based receiver of the prior art. In addition, our receiver combats fast fading channels by using the frequency diversity feature. This is a major cause for the degraded performance of conventional MMSE receivers. Therefore, our receiver is particularly suited for base stations in cellular telephone networks.

T-F Rake Receiver

FIG. 2 shows the T-F rake receiver 200 in greater detail. The T-F rake receiver combines time diversity and frequency diversity to combat multipath-fading channels. The received baseband signal $r_i$ 102 is modulated to different Doppler frequencies using multiple frequency shifts 210 to generate frequency diversity. The number of the frequency shifts depends on the channel conditions. A typical number of the frequency shift is one to two.

Our rake receiver achieves time diversity by using multiple fingers 220 with different time delays. In the case of fast fading channels, the T-F rake receiver 200 provides 3 dB improvement in the signal-to-noise-ratio at BER of $10^{-4}$ see, U.S. patent application Ser. No. 09/487,095 "Software-Based Digital Receiver Adaptable to Multiple Multiplexing Schemes," filed by Horng at al. on Jan. 19, 2000.

The output ($z_{i,j}$, for j=1, 2, . . . , N) 209 of each T-F rake finger 220 is sampled at symbol times $T_b$ 103 to form the down-sampled signal $u_{i,j}$ 104 that forms the input for the interference canceller 300.

Interference Canceller

Figure 3:
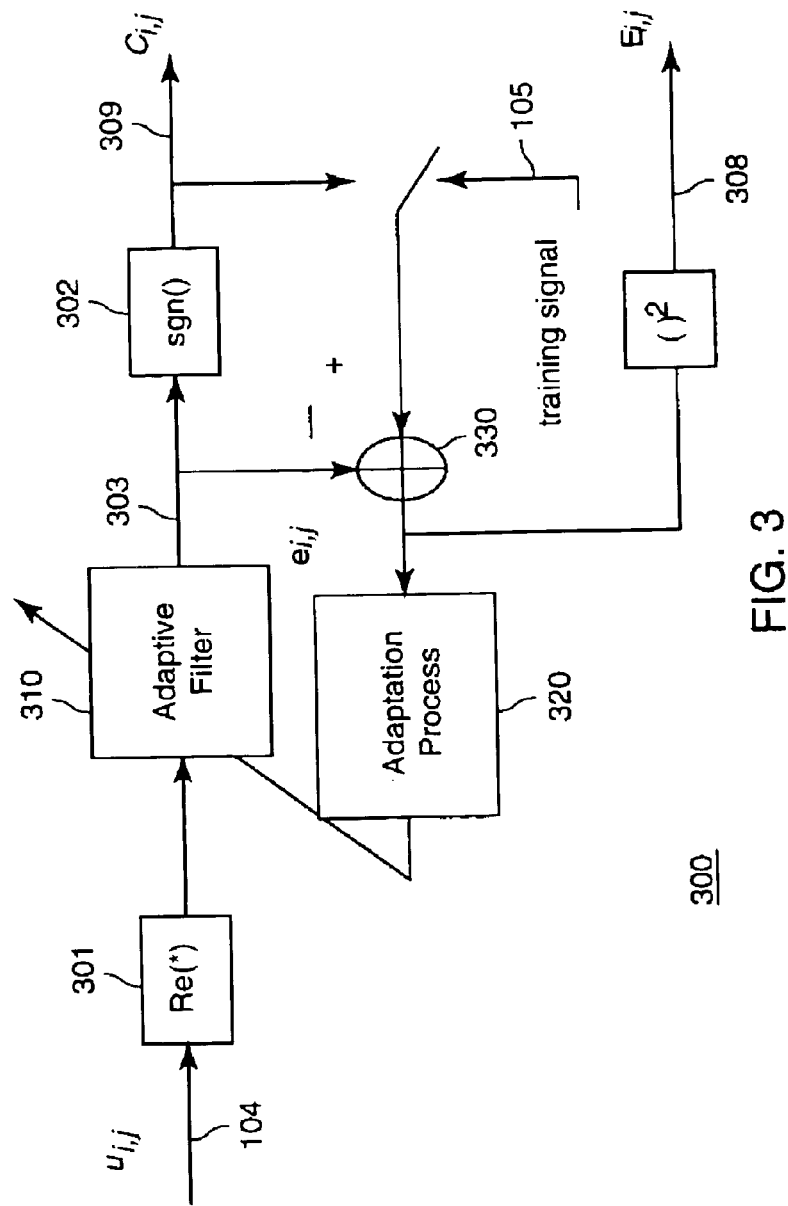
FIG. 3 is a block diagram of an adaptive filter based interference canceller of the receiver of FIG. 1.

FIG. 3 shows the IC 300 in greater detail. The real part (Re(*)) 301 of the down sampled signal $u_{i,j}$ 104 is applied to a corresponding adaptive filter 310, The adaptive filter 310 updates its tap-weights $w_{i,j}$ every symbol time $T_b$ 103 according to a least mean square (LMS) process 320. The sign 302 of the adaptive filter output 302 is taken as a reference signal. The reference signal is subtracted 330 by the adaptive filter output to form the error signal $e_{i,j}$ 308. The error signal is used as the input for the adaptive process 320 to update the coefficients of the adaptive filter 310. The tap-weight vector $w_{i,j}$ is updated as follow $$w_{i,j}(n+1) = w_{i,j}(n) + \mu e_{i,j}(n) \cdot Re(u_{i,j}(n)), \qquad (1)$$

where $\mu$ is the step size of the LMS process 320.

In a training stage, the training signal 105 is used as the reference signal instead of the sign of the adaptive filter output, the contributing symbol $C_{i,j}$ 309.

Training Sequence

The training signal 105 is a predetermined pseudo random (PN) sequence generated by using a polynomial. The receiver knows the sequence. A transmitter, e.g. a cellular telephone, transmits the training signal periodically. Different PN offset or different PN sequence can be chosen for different user phones to help resolve interference between users. During channel acquisition (training), equalizers of the receiver use a locally stored version of the PN training sequence to compare with received training sequence. The difference of the two is used to update the coefficients of the adaptive equalizers. As the equalizers converge over the training stage, the decision error will gradually reduce. This ensures that the coefficients of the adaptive filter are optimal for channel equalization at the end of the training stage.

Combiner

All contributing symbols $C_{i,j}$ 309 are combined in an optimal way to form the decision symbol d 109. Here, we use a maximum ratio combiner 110 to perform combining operation, i.e., the contributing symbols $C_{i,j}$s 309 are combined with different weights according to the error signal $E_{i,j}$ 308. The decision symbol d 109 is defined as $$d = sgn\left\{\sum_{i=1}^{M} \sum_{j=1}^{N} \alpha_{i,j} C_{i,j}\right\}, \qquad (2)$$

where $\alpha_i$ is the weighting factor and defined as $$\alpha_{i,j} = \frac{\sum_{i=1}^{M} \sum_{j=1}^{N} E_{i,j}}{E_{i,j}} \qquad (3)$$

It is noted that, in order to reduce complexity, one can use selection combining to perform combining operation, i.e., the diversity combiner selects the branch which instantaneously has the highest signal-to-noise ratio (SNR) or smallest error signal $E_{i,j}$ 308.

Frequency Offset Compensation

In order to achieve further improvement on the performance of our receiver, we compensate for the frequency offset caused by the Doppler effect. In general, the smaller the frequency offset, the better the performance. The present receiver estimates the frequency offset by identifying the location of the possible contributing symbols $C_{i,j}$ with the smallest error signal $E_{i,j}$ 308, i.e., $j_i$, is the index for the jth branch in ith antenna element.

The frequency offset $\Delta f$ at ith antenna is determined by $$\Delta f_i = (j_i - 1) \times \theta \text{ for, } i=1, 2, \ldots, M \qquad (4)$$

where $\theta$ is the frequency shift 210 in FIG. 2. For example, if $E_{2,3}$ 308 is the smallest error signal at the $2^{nd}$ antenna, then $j_2=3$ in Eq.(4), and the frequency offset at the $2^{nd}$ antenna $\Delta f_2$ is equal to (2$\theta$).

The frequency offset compensation can be done either at/by the receiver (base station) or at/by the mobile transmitter (cell phone). Here we consider these two cases.

Case 1: A mobile transceiver (cell phone) does not have the T-F rake receiver. In this case, the compensation is done during the downlink transmission from the base station, because the mobile transceiver cannot estimate the frequency offset using Eq.(4).

Figure 4:
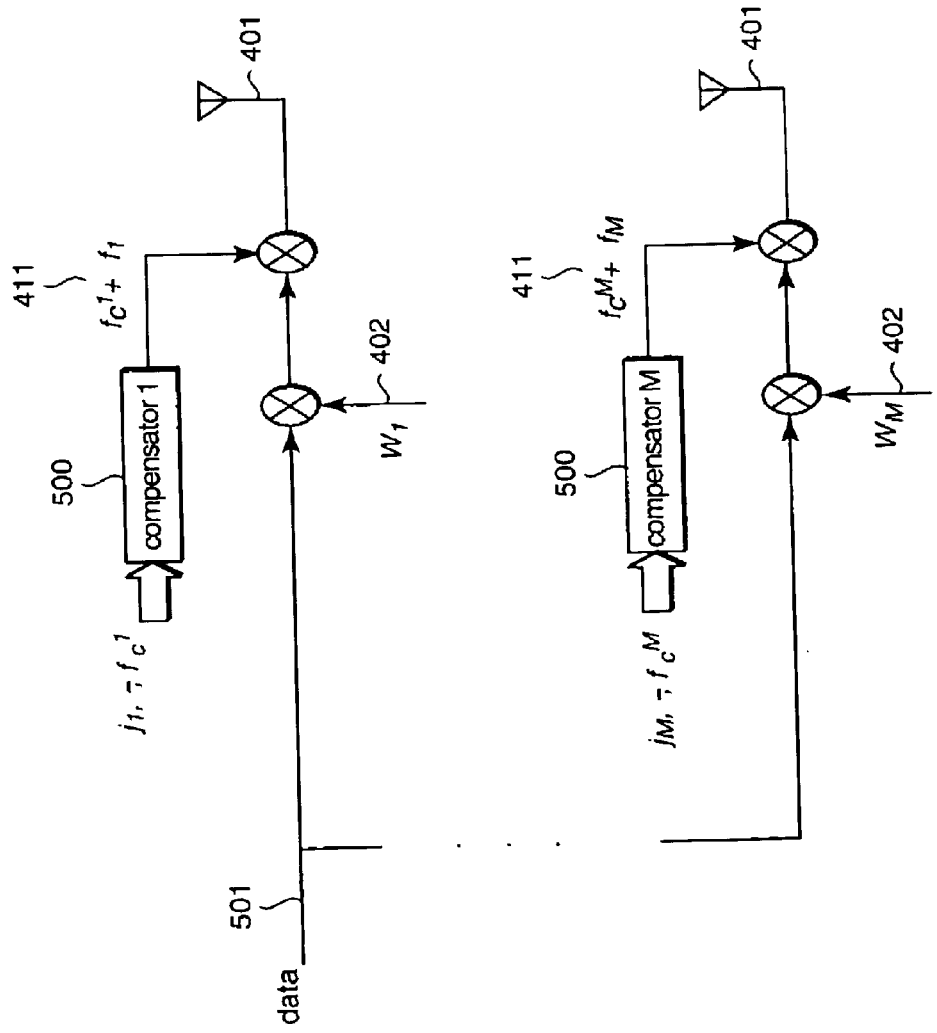
FIG. 4 is a block diagram of a compensator circuit used by the receiver of FIG. 1.

As shown in FIG. 4, a compensator 500 determines the frequency offset $\Delta f_i$ and makes transmission carrier frequency adjustment by the offset $\Delta f_i$. These adjusted carriers are used at each transmitter antenna 401 to modulate the transmitted data 501. A weight $\omega_i$ 402, for i=1, 2, . . . , M, at each antenna 401 is used to produce antenna beamforming for the purpose of transmit diversity to improve system performance.

Figure 5:
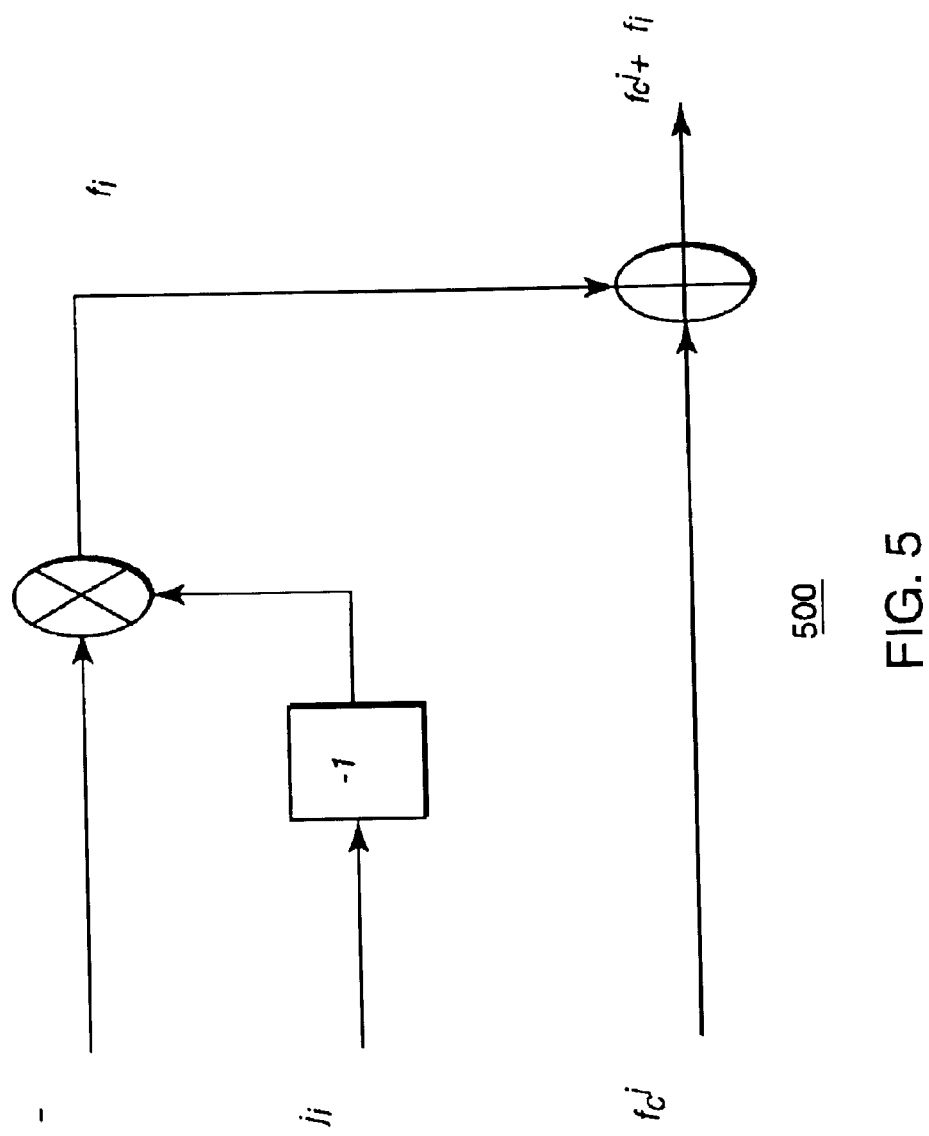
FIG. 5 is a block diagram of details of the compensator circuit of FIG. 4.

FIG. 5 shows the compensator 500 in greater detail. The frequency offset at ith antenna, $\Delta f_i$, is first determined based on Eq.(4) and the carrier frequency $f_c^i$ is then adjusted by $\Delta f_i$.

Case 2: A mobile transceiver has the T-F Rake receiver. In this case, the compensation is done at the mobile user side because the mobile receiver has the capability to estimate the frequency offset, and access to the network by the mobile receivers is random. Using a circuit similar to the one shown in FIG. 4, the mobile transmitter can make compensation in the uplink transmission.

Although the invention has been described by way of examples of preferred embodiments, it is to be understood that various other adaptations and IR modifications may be made within the spirit and scope of the invention. Therefore, it is the object of the appended claims to cover all such variations and modifications as come within the true spirit and scope of the invention.

We claim:

1. A digital receiver for detecting symbols in a baseband signal in a DS-CDMA network, comprising:
   a plurality of spaced apart antennas;
   a time-frequency rake receiver connected to each of the antennas, wherein a frequency offset is estimated by identifying a location of contributing symbols with a smallest error signal;
   an interference canceller connected to each output of each of the rake receiver, each interference canceller producing a contributing symbol in parallel, wherein the outputs of each interference canceller include an error signal and one contributing symbol; and
   a diversity combiner to determine a decision symbol from the plurality of contributing symbols, the decision symbol corresponding to the baseband signal.

2. The receiver of claim 1 wherein the antennas are spaced about three to five times the wavelength of the baseband signals.

3. The receiver of claim 1 wherein each rake receiver includes a plurality of rake fingers, and wherein the baseband signal received at each antenna is modulated to a plurality of different frequencies, one frequency for each of the plurality of rake fingers.

4. The receiver of claim 3 wherein each rake finger has a different time delay.

5. The receiver of claim 4 wherein the output of each rake finger is sampled at symbol times $T_b$ to form a down-sampled signal for each interference canceller.

6. The receiver of claim 5 wherein each interference canceller comprises:
   an adaptive filter to receive a real part (Re(*)) of the down-sample signal $u_{i,j}$, the adaptive filter including a plurality of taps, each tap having a tap weight, and wherein the tap weights are update every symbol time $T_b$ according to a least mean square process.

7. The receiver of claim 6 wherein a sign of an output of the adaptive filter is a reference signal subtracted by the adaptive filter.

8. The receiver of claim 7 wherein the reference signal is a training signal during an initial training stage.

9. The receiver of claim 8 wherein the training signal is a predetermined random sequence generated by using a polynomial known to the receiver.

10. The receiver of claim 8 wherein a transmitter periodically transmits the training signal to establish initial tap weights for adaptive filter of each interference canceller.

11. The receiver of claim 1 wherein the diversity combiner combines all contributing symbols $C_{i,j}$ with different weights according to the error signals $E_{i,j}$, and the decision symbol d is defined by $$d = sgn\left\{\sum_{i=1}^{M} \sum_{j=1}^{N} \alpha_{i,j} C_{i,j}\right\},$$

where $\alpha_i$ is a weighting factor $$\alpha_{i,j} = \frac{\sum_{i=1}^{M} \sum_{j=1}^{N} E_{i,j}}{E_{i,j}},$$

where M is the number of antennas, and N is the number of frequency shifts at each antenna.

12. The receiver of claim 1 wherein the decision signal has the smallest error signal.

13. The receiver of claim 1 wherein the decision signal has a highest signal-to-noise ratio.

* * * * *